March 16, 1926.  
H. E. MUNGER  
HEATER ATTACHMENT FOR MOTOR VEHICLES  
Filed April 27, 1925  
1,577,289  
2 Sheets-Sheet 1
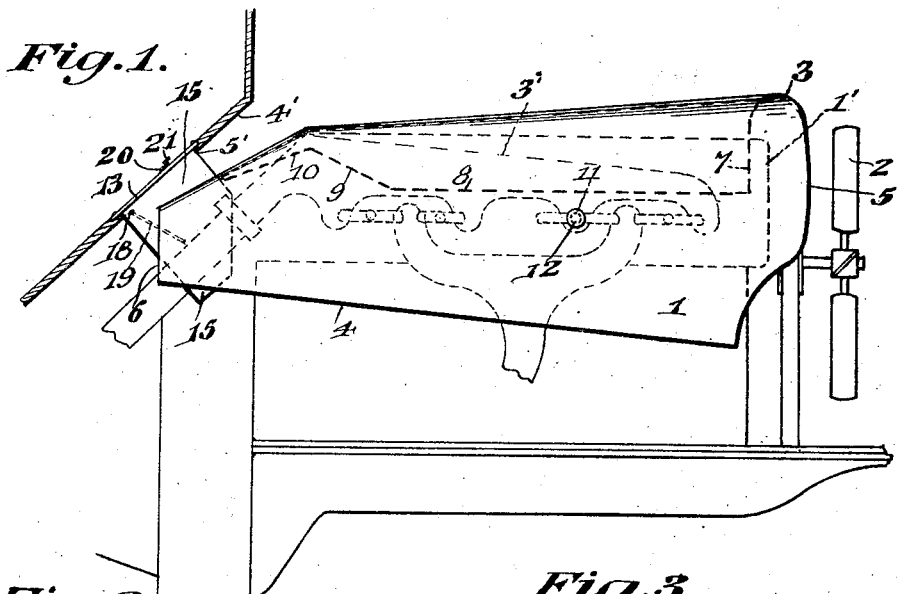
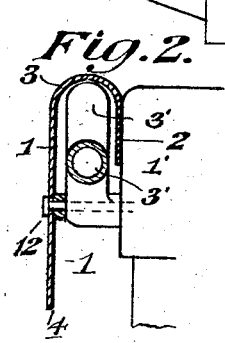
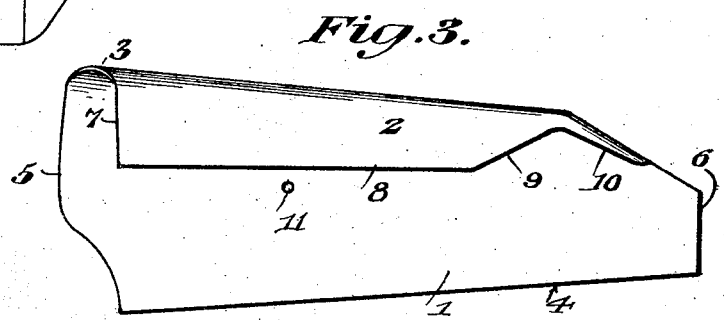
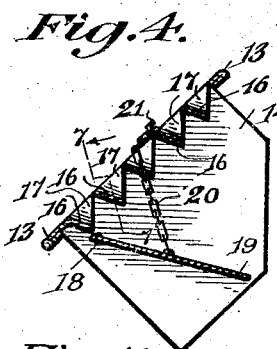
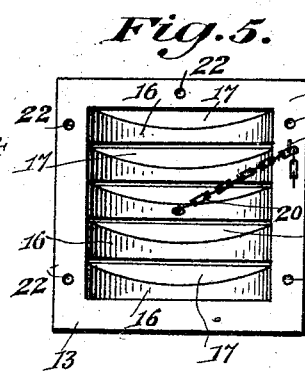
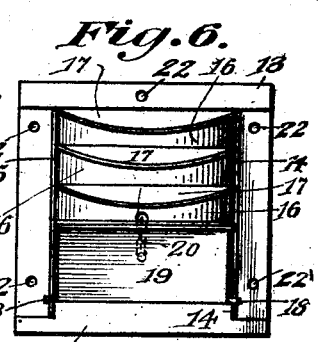
INVENTOR.  
Harlan E. Munger,  
BY  
Geo. P. Kimmel.  
ATTORNEY.

March 16, 1926. 1,577,289
H. E. MUNGER
HEATER ATTACHMENT FOR MOTOR VEHICLES
Filed April 27, 1925 2 Sheets-Sheet 2
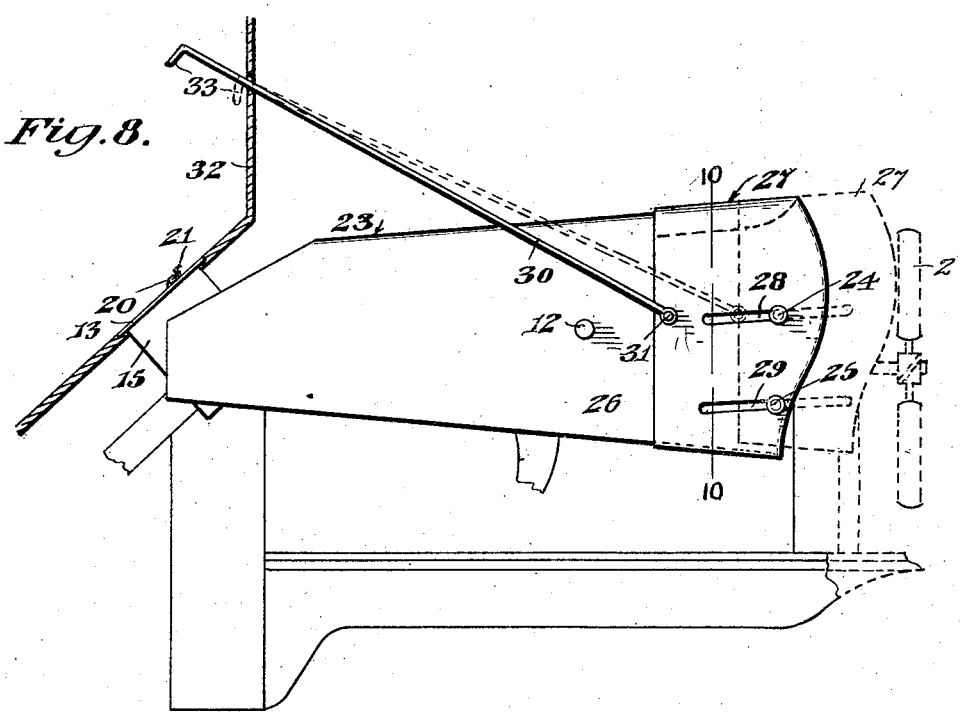
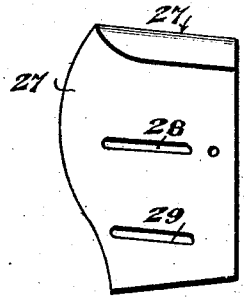
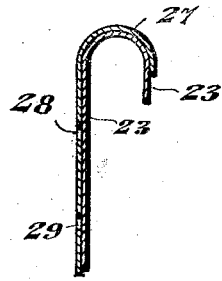
INVENTOR.
Harlan E. Munger,
BY
Geo. P. Kimmel, ATTORNEY.

Patented Mar. 16, 1926.

1,577,289

UNITED STATES PATENT OFFICE.

HARLAN E. MUNGER, OF BALKO, OKLAHOMA.

HEATER ATTACHMENT FOR MOTOR VEHICLES.

Application filed April 27, 1925. Serial No. 26,198.

*To all whom it may concern:*

Be it known that I, HARLAN E. MUNGER, a citizen of the United States, residing at Balko, in the county of Beaver and State of Oklahoma, have invented certain new and useful Improvements in Heater Attachments for Motor Vehicles, of which the following is a specification.

This invention relates to a heating attachment for motor vehicles, and has for its object to provide, in a manner as hereinafter set forth, an attachment of such class for directing air travelling over and heated from the exhaust manifold of the motor into the interior of the body of the vehicle when the latter is travelling against or with the wind or to the side.

A further object of the invention is to provide, in a manner as hereinafter set forth, an attachment of the class referred to, having means to provide for the heating of air by the exhaust manifold of the motor of the vehicle, and further for directing the largest possible volume of the hot air to the body of the vehicle.

A further object of the invention is to provide, in a manner as hereinafter set forth, an attachment of the class referred to, having means, whereby the funnel-shaped current of air created by and forced rearwardly by the fan of the vehicle, is caught at one side thereof and directed to be heated from the exhaust manifold of the engine and discharged through a controllable register into the body portion of the vehicle.

Further objects of the invention are to provide, in a manner as hereinafter set forth, a heating attachment for the purpose referred to, which is simple in its construction and arrangement, strong, durable, compact, thoroughly efficient in its use, conveniently installed with respect to a motor vehicle, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation of a heating attachment, in accordance with this invention, showing the adaptation thereof with respect to the engine or motor of a vehicle.

Figure 2 is a vertical sectional view of the attachment and illustrating the position thereof with respect to the exhaust manifold of the engine of a motor.

Figure 3 is a rear elevation of the air collecting, confining and directing element.

Figure 4 is a vertical sectional view of the register.

Figure 5 is a front elevation thereof.

Figure 6 is a rear elevation.

Figure 7 is a section on line 7—7, Figure 4.

Figure 8 is a side elevation of the attachment provided with an air controlling element.

Figure 9 is a rear elevation of the controlling element.

Figure 10 is a section on line 10—10, Figure 8.

Referring to the drawings in detail, 1' denotes the engine block, 2' the fan, 3' the exhaust manifold, and 4' the foot board of the body of a motor vehicle. The foregoing elements are of known construction, with the exception that the foot board is provided with an opening 5' for the reception of the register of the attachment to be presently referred to.

A heating attachment, in accordance with this invention, comprises a register and a combined air collecting, confining and directing element and with the former extended into the latter at the rear end thereof.

The combined air collecting, confining and directing element is of a length to extend from a point forwardly of the engine block 1' and to a point in close proximity to the foot board 4'. The said element is formed from a single sheet of suitable metallic material and bent to provide a vertically disposed outer or front side portion 1, a vertically disposed inner or back side portion 2 of materially less height than the outer portion 1, and a curved top portion 3 which spaces the inner or back portion 1 from the inner portion 2. The outer portion 2 is of a height less than half the height of the outer or front portion 1, as well as being of less length than the latter. The inner or back portion 2, had its rear end positioned at a point forwardly of the rear end of the outer portion 1, and said inner or back portion 2 has its forward end positioned rearwardly of the forward end of the outer portion 1. The rear end of the top 3 is positioned at a point removed from the rear end of the outer portion 1.

The lower edge 4 of the outer portion 1 inclines forwardly and downwardly. The forward edge 5 of the outer portion 1 is of compound curvature. The rear edge 6 of the outer portion 1 is vertical. The top portion 3 inclines downwardly from the forward edge 5 of the outer portion 1, that is to say the major portion of the top portion 3, and the other portion of the top portion 3 depends downwardly at a greater inclination than the major portion thereof. The forward edge 7 of the inner portion 2 is vertical but is spaced rearwardly with respect to the forward edge 5 of the outer portion 1. The lower edge of the inner portion 2, for the major part of its length, as indicated at 8, extends longitudinally with respect to said portion 2, then upwardly at an inclination, as at 9, and then downwardly at an inclination, as at 10, and the inclined portions 9 and 10 of the lower edge of the inner portion 2 provide a clearance for the rear portion of the exhaust manifold. As the bend 3 terminates at a point removed from the rear edge 6 of the outer portion 1, a clearance is provided for the sides of the register to be presently referred to.

The height of the outer portion 1 is such as to depend a substantial distance below the exhaust manifold. The outer portion 1 is provided with an opening 11 for the passage of a hold-fast device 12, to secure said element in enclosing position with respect to the exhaust manifold 3'. The upper part of the outer portion 1 projects away from the exhaust manifold 3' at a slight inclination, see Figure 2. The outer portion 1 and bend 3 extend in as close proximity as it is possible to the fan 2'.

The register is formed from a single sheet of metallic material bent upon itself to provide a front 13, and a pair of rearwardly extending wings 14, 15, which are inset with respect to the front 13. The front is slitted transversely and the material between the slits, as indicated at 16, is inset with respect to the outer face of the front 13 to provide transversely disposed hot air discharge passages 17. Mounted in the wings 14 and 15 is a pivot bar 18, carrying a flap 19 for controlling the discharge of hot air through certain of the passages 17. Extending through one of the inset portions of the front 13 is a chain 20, which is connected to the flap 19 for the purpose of elevating and lowering the same. The front 13 has a hook 21 for detachably connecting the chain 20 therewith for the purpose of retaining the flap 19 in the position to which it has been shifted. The wings 14 and 15 are extended through the opening 5' and into the rear end of the combined air collecting, confining and directing element so that the hot air, as it passes through said element, will be conducted between the wings of the register and pass through the passages 17 into the body of the vehicle. The front 13 is formed with openings 22 for the passage of hold-fast devices to secure the register to the foot board 4'.

When the combined air collecting, confining and directing element is arranged in operative position, the inner portion 2 is positioned behind the exhaust manifold, the bend 3 extends over the top of the manifold, and the outer portion 4 is arranged at the outer side of the exhaust manifold and depends a substantial distance therefrom. See Figure 2. The combined air collecting, confining and directing element is of greater height at its front than at its rear and fresh air is driven into said element by the fan through the open front thereof and retained in contact with the hot exhaust manifold until it reaches the register through the medium of the outer portion 1 of said element. The air is carried above the exhaust manifold, but is kept in close contact with it from the time it enters the front of said element until it passes through the register into the body of the car.

In Figures 8, 9 and 10 there is shown an air controlling element arranged on the forward end of the air collecting, confining and directing element and the latter is indicated at 23, is of the same construction as that shown in Figure 3, with this exception that it is provided with a pair of spaced laterally extending headed retaining studs 24, 25, near the forward terminus of the outer face of the outer portion 26 of said element. The air controlling element, indicated at 27, is slidably mounted on the forward end of the element 23, and is of the same contour as the contour of the forward terminal portion of element 23, that is to say that the outer, inner and top portions of element 27 are of the same shape as the corresponding parts of the element 23. The outer portion of the element 27 is provided with a pair of inclined slots 28, 29, which respectively in connection with the headed studs 24, 25, slidably connect the element 27 in overlapped position with respect to the forward end portion of the element 23. The element 27 is adapted to be shifted to project beyond the forward edge of element 23 and for this purpose a rearwardly extending shifting rod 30 is provided, and which has its forward end pivoted, as at 31, to the element 27 and its rear end projected through the instrument board 32 of the vehicle and formed with a handle 33.

The purpose of the element 27 is to control the supply of air to the element 23, at the forward end of the latter. When the element 27 is shifted to the outmost position, the heater receives the largest amount of air that is possible to be forced therein. This is very beneficial in going with the wind or at an angle with it, and also when running without the fan. By shifting the element 27 rearwardly, it prevents an excess of air from entering the heater when going against the wind, and also of free access for the purpose of adjusting the fan, fan-belt and supplying of oil to the crank case.

The element 27 is of a width and connected to the element 23 in such manner as to permit it to be extended to within one inch of the fan and when shifted rearwardly to be positioned a distance of four inches from the fan.

The construction and arrangement of the combined air collecting, confining and directing element in connection with the controlling element provides means for directing heated air into the body of the vehicle when the latter is travelling with, against or at an angle to the wind. The fan draws the air through the radiator and instead of throwing it straight back it throws it in a funnel-shaped current to the outside. In order to catch this funnel-shaped current of air and to draw it to the heater and into the car, the combined air collecting, confining and directing element must be constructed with a high open front, as is disclosed herein. Further the outer portion 1 of the element must extend forwardly of the engine block and far below the exhaust manifold and as close as possible to the fan without interfering therewith, in the manner as shown and described. This arrangement prevents the air which comes in through the opening in the hood and other openings passing around the exhaust manifold and carries out the warm air, as when such prevention is not present, the air entering the hood and other openings acts as a resistance to the air entering from the fan and reduces the temperature and quantity of air that enters the car, and this latter objection is overcome by constructing and arranging the outer portion of the combined air collecting, confining and directing element in the manner as shown and described.

It is thought that the many advantages of a heating attachment, in accordance with this invention, can be readily understood, and although the preferred embodiment of the invention is as illustrated and described, yet it is to be understood that changes in the details of construction can be had which will fall within the scope of the invention as claimed.

What I claim is:—

1. A heating attachment for motor vehicles comprising a combined air collecting, confining and directing element adapted to be arranged in overlapping position with respect to the exhaust manifold of the vehicle and including an outer portion, an inner portion and an upper portion spacing the inner and outer portions from each other, said outer portion of a length greater than the length of the engine block and projecting forwardly and rearwardly therefrom, said inner portion of less length than said outer portion and further of materially less height than the latter, an air controlling element slidably mounted on, overlapping and conforming in contour to the shape of the forward end portion of said directing element and capable of being extended to a point in close proximity to the fan of the vehicle and the said elements having coacting means for slidably connecting the controlling element to the directing element.

2. In a heating attachment for motor vehicles, a combined air collecting, confining and directing element adapted to be arranged in overlapping position with respect to the exhaust manifold of the engine of the vehicle, said element a top, inner and outer side portions, said inner portion of materially less height than said outer portion, said outer portion of a length to project forwardly and rearwardly of the engine block of the vehicle, said outer portion of a height to extend a substantial distance below the exhaust manifold, and an air controlling element slidably mounted on, overlapping and conforming in contour to the shape of the forward end portion of said directing element and capable of being extended to a point in close proximity to the fan of the vehicle.

3. In a heating attachment for motor vehicles, a combined air collecting, confining and directing element adapted to be arranged in overlapping position with respect to the exhaust manifold of the engine, said element forming a top, inner and outer side portions, said top inclining downwardly lengthwise thereof, said inner portion of materially less height than said outer portion, said outer portion of a length to project forwardly and rearwardly of the engine block of the vehicle and further of a height to extend a substantial distance below the exhaust manifold.

4. In a heating attachment for motor vehicles, a combined air collecting, confining and directing element adapted to be arranged in overlapping position with respect to the exhaust manifold of the engine, said element forming a top, inner and outer side portions, said top inclining downwardly lengthwise thereof, said inner portion of materially less height than said outer portion, said outer portion of a length to project forwardly and rearwardly of the engine block of the vehicle and further of a height to extend a substantial distance below the exhaust manifold, an air controlling element slidably mounted on the forward end of said directing element, said controlling element overlapping and conforming in contour to the shape of the forward end portion of said directing element and capable of being extended to a point in close proximity to the fan of the vehicle, and said elements having coacting means for slidably connecting the outer portion of the controlling element to the outer portion of the directing element.

In testimony whereof, I affix my signature hereto.

HARLAN E. MUNGER.